(12) United States Patent
Saito (10) Patent No.: US 7,503,169 B2
(45) Date of Patent: Mar. 17, 2009

(54) EXHAUST PURIFICATION APPARATUS

(75) Inventor: Atsushi Saito, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 157 days.

(21) Appl. No.: 11/593,133

(22) Filed: Nov. 6, 2006

(65) Prior Publication Data

US 2007/0101702 A1 May 10, 2007

(30) Foreign Application Priority Data

Nov. 7, 2005 (JP) ............................. 2005-322081
Sep. 1, 2006 (JP) ............................. 2006-237573

(51) Int. Cl.
*F01N 3/00* (2006.01)
(52) U.S. Cl. ............................. 60/295; 60/274; 60/280; 60/286; 60/297
(58) Field of Classification Search ................... 60/274, 60/278, 280, 285, 286, 295, 297, 311
See application file for complete search history.

(56) References Cited

U.S. PATENT DOCUMENTS 7,021,051 B2 * 4/2006 Igarashi et al. ................ 60/295
7,036,305 B2 * 5/2006 Nishimura .................... 60/286
7,043,903 B2 * 5/2006 Onodera et al. ............... 60/295
7,104,050 B2 * 9/2006 Sato et al. ..................... 60/295
7,181,909 B2 * 2/2007 Sato et al. ..................... 60/297
7,337,608 B2 * 3/2008 Gabe et al. .................... 60/286

FOREIGN PATENT DOCUMENTS

| EP | 1333165 | 8/2003 |
| FR | 2799504 | 4/2001 |
| JP | 2004-239200 | 8/2004 |
| JP | 2005-201251 | 7/2005 |

* cited by examiner

*Primary Examiner*—Binh Q. Tran
(74) *Attorney, Agent, or Firm*—Global IP Counselors, LLP (57) ABSTRACT

An exhaust purification apparatus has an engine controller with a storage device that stores information regarding when it is time for regeneration of the filter. The exhaust purification apparatus carries out a regeneration process of the filter based on the information stored in the storage device when the time for regeneration of the filter has been reached. The exhaust purification apparatus also determines whether an engine operation is taking place for the first time following replacement of the engine controller, and then forcibly carries out the regeneration process of the filter upon determining that engine operation is taking place for the first time following replacement of the engine controller.

7 Claims, 4 Drawing Sheets

EXHAUST PURIFICATION APPARATUS

CROSS-REFERENCE TO RELATED APPLICATIONS

This application claims priority to Japanese Patent Application No. 2005-322081, filed on Nov. 7, 2005, and Japanese Patent Application No. 2006-237573, filed on Sep. 1, 2006. The entire disclosure of Japanese Patent Application No. 2005-322081 and Japanese Patent Application No. 2006-237573, filed on Sep. 1, 2006 are hereby incorporated herein by reference.

BACKGROUND OF THE INVENTION

1. Field of the Invention

The present invention generally relates to an exhaust purification apparatus. More specifically, present invention generally relates to an exhaust purification apparatus having a regeneration process for a filter that collects particulate present in the exhaust gases of a diesel engine.

2. Background Information

Particulate filters disposed in the exhaust passage of a diesel engine in order to trap particulate matter discharged from the diesel engine and prevent them from being emitted into the atmosphere are known in the art. While such a particulate filter can collect particulate matter during operation of the engine, there is only a certain acceptable amount of particulate matter that can be collected. Thus, typical practice is to regenerate the filter once accumulated particulate matter has reached a value equivalent to the acceptable amount, by increasing the temperature of the particulate filter in order to burn away the accumulated particulate matter.

In view of the above, it will be apparent to those skilled in the art from this disclosure that there exists a need for an improved exhaust purification apparatus. This invention addresses this need in the art as well as other needs, which will become apparent to those skilled in the art from this disclosure.

SUMMARY OF THE INVENTION

It has been discovered that in a diesel engine having a filter installed for trapping particulate in exhaust, information used to determine whether the period for regenerating the filter has been reached (e.g. the amount of accumulated particulate, operation history, or the like) is stored in an EEPROM (storage device) in the engine controller, so as to not be lost after engine operation has been shut down.

In such a case, if the engine controller equipped with the storage device is replaced with a new one, the information mentioned above will be lost. Thus, after replacement of the engine controller, the new engine controller will initiate control on the assumption that no particulate has accumulated in the filter. That is, if any particulate has accumulated in the filter at the time that the engine controller is replaced, a discrepancy equivalent to the accumulated particulate will arise. Consequently, if particulate that has accumulated in the filter is simply left at the time that the engine controller is replaced, it is conceivable that an excessive amount of particulate will accumulate in the filter by the time that the new engine controller determines that the period to regenerate the filter has been reached.

It is accordingly necessary to forcibly carry out a regeneration process on the filter when replacing the engine controller, in order to burn away (regenerate) particulate from the filter so that excessive particulate does not accumulate in the filter by the time that the first filter regeneration period is reached after replacing the engine controller with a new one. Thus, past practice at dealerships and service centers has been to use certain service tools in order to forcibly carry out a regeneration process when the engine controller is replaced.

However, there are instances where, depending on conditions such as the geographical region or the dealership, service using the service tools mentioned above is not available. In such cases, irrespective of the fact that particulate has accumulated in the filter at the time that the engine controller is replaced, after replacement of the engine controller, the new engine controller will initiate control as if there was no particulate accumulation in the filter. Consequently, by the time that the engine controller determines that first post-replacement regeneration period for the filter has arrived, particulate may have accumulated in the filter at a level exceeding the acceptable amount. Combusting particulate at a level exceeding the acceptable amount during the initial regeneration process of the filter after replacing the engine controller in this way may have a detrimental effect on filter durability.

It is therefore an object of the present invention to provide an exhaust purification method and an exhaust purification apparatus that avoid any detrimental effects on filter durability, even in cases where service using service tools is not available when the engine controller is replaced.

In order to achieve the aforementioned object and other objects, an exhaust purification apparatus in accordance with the present invention is basically provided with an accumulated particulate level estimating section, a particulate filter regenerating section, a determination processing section and a regeneration processing section. The accumulated particulate level estimating section is configured to estimate an accumulated level of particulate matter in a particulate filter. The particulate filter regenerating section is configured to raise temperature of the particulate filter to regenerate particulate that has accumulated, when the accumulated level of the particulate matter estimated by the accumulated level estimating section has reached a prescribed level. The determination processing section is configured to determine if an engine is operating for a first time following replacement of an engine controller. The regeneration processing section is configured to regenerate a particulate filter even if an accumulated level of particulate matter is below a prescribed level, upon the determination processing section determining that the engine is being operated for the first time following replacement of the engine controller.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
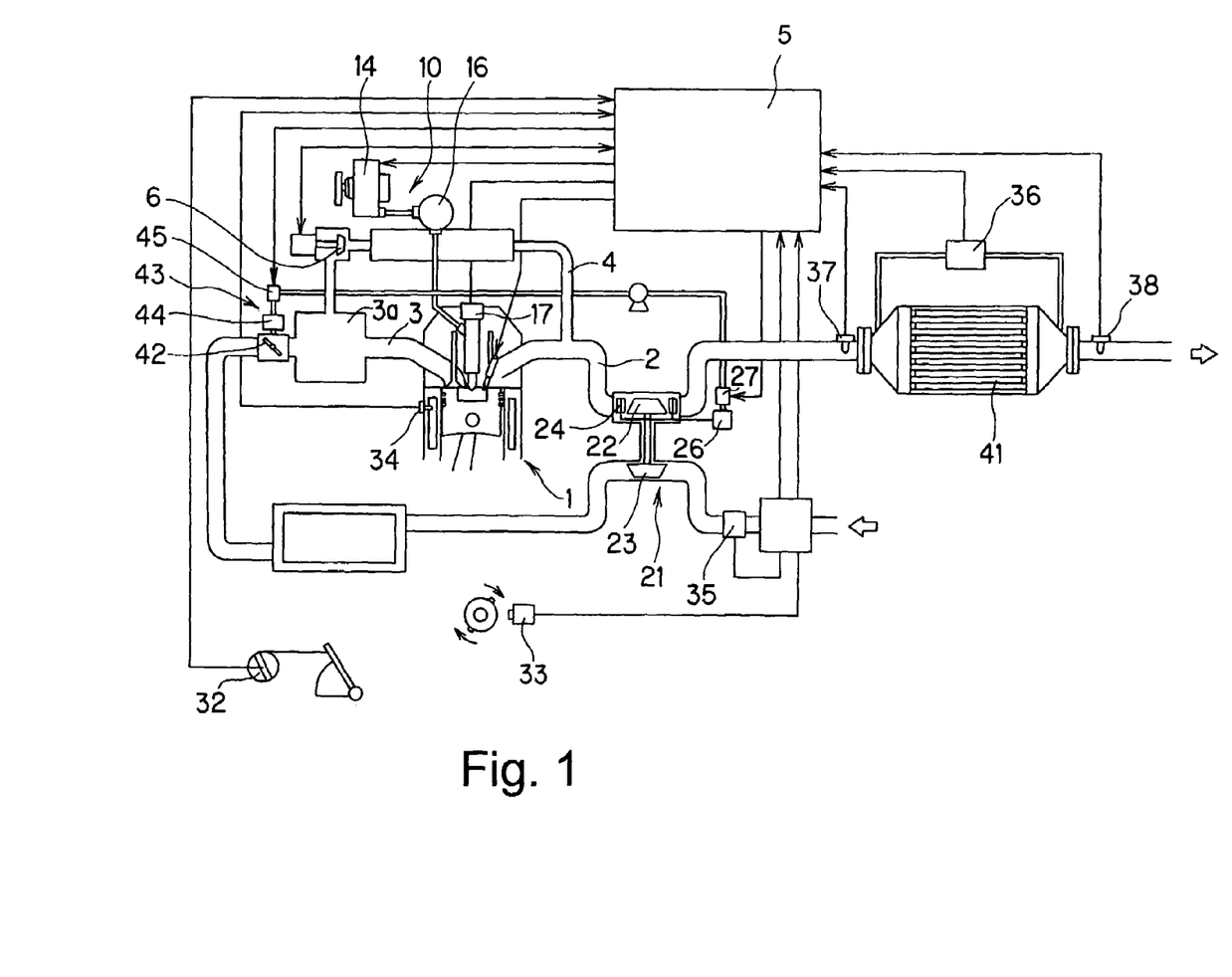
FIG. 1 is a diagrammatic view of an engine control apparatus or system for an internal combustion engine, e.g., a diesel engine, that is equipped with an exhaust purification apparatus in accordance with one embodiment of the present invention.

Referring initially to FIG. 1, an engine control apparatus or system is illustrated for an internal combustion engine such as a turbocharged diesel engine 1 that is equipped with an exhaust purification apparatus in accordance with one embodiment of the present invention. The exhaust purification apparatus in accordance with the present invention can be applied to other internal combustion engines used in automobiles and the like. The engine 1 has an exhaust passage 2 and an intake passage 3 with a collector 3a. An EGR passage 4 links the exhaust passage 2 to the collector 3a of the air intake passage 3. The operation of the engine 1 is controlled by an engine controller 5. More specifically, the engine controller 5 preferably includes a microcomputer with among other things a microcomputer comprising a central processing unit (CPU),a read-only memory (ROM) device, a random access memory (RAM) device, and an input/output interface (I/O interface). The control unit 5 has a control program that controls the engine 1 as discussed below. The microcomputer of the engine controller 5 is programmed to control the various components of the engine 1. The memory circuit stores processing results and control programs that are run by the processor circuit. The engine controller 5 is operatively coupled to the various components of the engine 1 in a conventional manner. The internal RAM of the engine controller 5 stores statuses of operational flags and various control data. The engine controller 5 is capable of selectively controlling any of the components of the control system in accordance with the control program. It will be apparent to those skilled in the art from this disclosure that the precise structure and algorithms for the engine controller 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

An EGR valve 6 is disposed in the EGR passage 4 and is operatively connected to the engine controller 5. Preferably, the EGR valve 6 is a diaphragm type EGR valve 6 that operates in response to control pressure from a pressure control valve (not shown). The pressure control valve is actuated by a duty control signal from an engine controller 5. Thus, a prescribed rate of EGR depending on operating conditions is obtained. Alternately, the valve opening degree of the EGR valve 6 can be continuously and variably controlled by a stepping motor or any other device that can continuously and variably control the valve opening degree of the EGR valve 6. In any event, the valve opening degree of the EGR valve 6 is controlled by the engine controller 5 to obtain a specified EGR rate in response to the operating conditions received by the engine controller 5 from various operating condition sensors. In other words, the valve opening degree of the EGR valve 6 is variably controlled (EGR control method) so as to variably control the EGR rate towards a target EGR rate set by the engine controller 5. For example, the EGR rate is set to a large EGR rate when the engine 1 is operating in a low-speed, low-load region, and as the engine speed and load becomes higher, the EGR rate becomes lower.

The engine 1 is also preferably equipped with a common rail fuel injection device 10. This common rail fuel injection device 10 mainly comprises a fuel tank (not shown), a low pressure pump (not shown), a high-pressure supply pump 14, a common rail or pressure accumulator 16, and an injector 17 for each cylinder. In this common rail fuel injection device 10, after fuel is pressurized by a high pressure fuel pump 14, the fuel is fed through a high-pressure fuel supply passage such that the fuel accumulates in an accumulator 16. The fuel is then distributed from this accumulator 16 to a plurality of fuel injectors 17 for each of the engine cylinders. The high pressure fuel in the accumulator 16 is then injected directly into each cylinder by actuating valve opening of the injector 17. The high-pressure supply pump 14 must feed the necessary amount of fuel under pressure in order to control the pressure of the fuel within the accumulator 16 to the prescribed pressure. For this purpose, a single linear solenoid valve type intake control valve is provided, together with a two-way valve, an outlet orifice, an inlet orifice, a command piston or plunger, and a nozzle needle. The supply of fuel to the plunger chamber is controlled by varying the planar dimension of the intake port. The engine controller 5 is configured to control the opening and closing of the injectors 17 to inject fuel into the engine cylinders. The fuel pressure inside the accumulator 16 is variably adjusted by a pressure regulator (not shown) and a fuel pressure sensor (not shown) is provided in the accumulator 16 for detecting the fuel pressure. The fuel pressure sensor is configured and arranged to output to the engine controller 5 a fuel pressure signal that is indicative of the fuel pressure in the accumulator 16.

In the absence of applied current to the solenoid, the two-way valve is urged downwardly by a spring force, and the outlet orifice is in the closed state. Thus, if an attempt is made to push down the command piston, the control chamber pressure at the upper end of the command piston will become equal to the pressure pushing the nozzle needle upwardly, and the nozzle needle will be maintained in the closed valve state in abutment with the seat by the difference in pressure receiving area and the nozzle spring force, so that fuel injection does not take place.

When a current is applied the solenoid, the two-way valve is pulled upwardly by the attracting force of the solenoid. The outlet orifice is opened thereby, and fuel flows upwardly from the control chamber. Once the fuel flows out, pressure in the control chamber acting downwardly on the command piston drops. Consequently, the command piston and the nozzle needle rise, and fuel injection from the nozzle aperture commences. As the current continues to be supplied to the solenoid, the nozzle needle reaches maximum lift, producing the maximum rate of injection.

When current is cut off to the solenoid, on the other hand, the two-way valve descends, closing off the outlet orifice. Thus, control chamber pressure rises as fuel flows in to the control chamber through the inlet orifice. By so doing, the nozzle needle descends suddenly into abutment with the seat. Subsequently, the nozzle aperture is closed, and fuel injection concludes.

Thus, the timing of fuel injection is controlled by the timing of supply of current to the solenoid, and the amount of fuel injected is controlled by the duration that current is supplied to the solenoid. By repeatedly supplying and cutting off current to the solenoid during a single cycle, it is possible to achieve multistage injection. Multistage injection refers to pilot injection preceding the main injection, to post injection following the main injection, or the like.

The engine 1 has a variable-capacity turbo supercharger 21 equipped with a coaxially arranged exhaust turbine 22 and a compressor 23. The turbine 22 converts the thermal energy of exhaust gases into rotational energy. The compressor 23 compresses the intake air. The compressor 23 functions as an air adjustment device of the engine control system that is configured to affect the fresh intake air quantity drawn into the combustion chamber. In other words, the compressor 23 is an air adjustment device that is controlled by an air adjustment section of the engine controller 5 to affect or otherwise influence the fresh intake air quantity drawn into the combustion chamber.

The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is provided with a variable nozzle 24, which is a variable capacity adjusting device, that is arranged at an inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). In other words, at the low rotational speed end, the engine controller 5 controls nozzle opening of the variable nozzle 24 to a tilted state in order to accelerate the flow speed of the exhaust entering the turbine 22. By so doing, the prescribed charging pressure may be attained from the low rotation speed range. On the other hand, a relatively large capacity is preferably achieved by increasing the opening degree of the variable nozzle 24 when the exhaust gas flow rate is relatively large (such as a high speed region). At high rotational speed end, on the other hand, the nozzle opening is controlled to the fully open state, so that exhaust enters the turbine with no resistance. The variable nozzle 24 is preferably driven by a diaphragm actuator 26 configured to respond to a control pressure (negative control pressure), and the control pressure is generated using a duty-controlled pressure control valve 27. Thus, the actuating diaphragm actuator 26 is configured and arranged to actuate the variable nozzle 24 in response to control pressure by the pressure control valve 27. A duty control signal is produced so as to set the actual opening of the variable nozzle 24 to the target nozzle opening, and this duty control signal is output to the pressure control valve 27.

An intake throttle valve 42 actuated by the actuator 43 is provided at the inlet of the collector 3a. The actuator 43 comprises a diaphragm actuator 44 for actuating the intake throttle valve 42 in response to control pressure, and a pressure control valve 45 for regulating control pressure to this diaphragm actuator 44. A duty control signal is produced so that the intake throttle valve 42 closes to the target nozzle opening, and this duty control signal is output to the pressure control valve 45.

Figure 2:
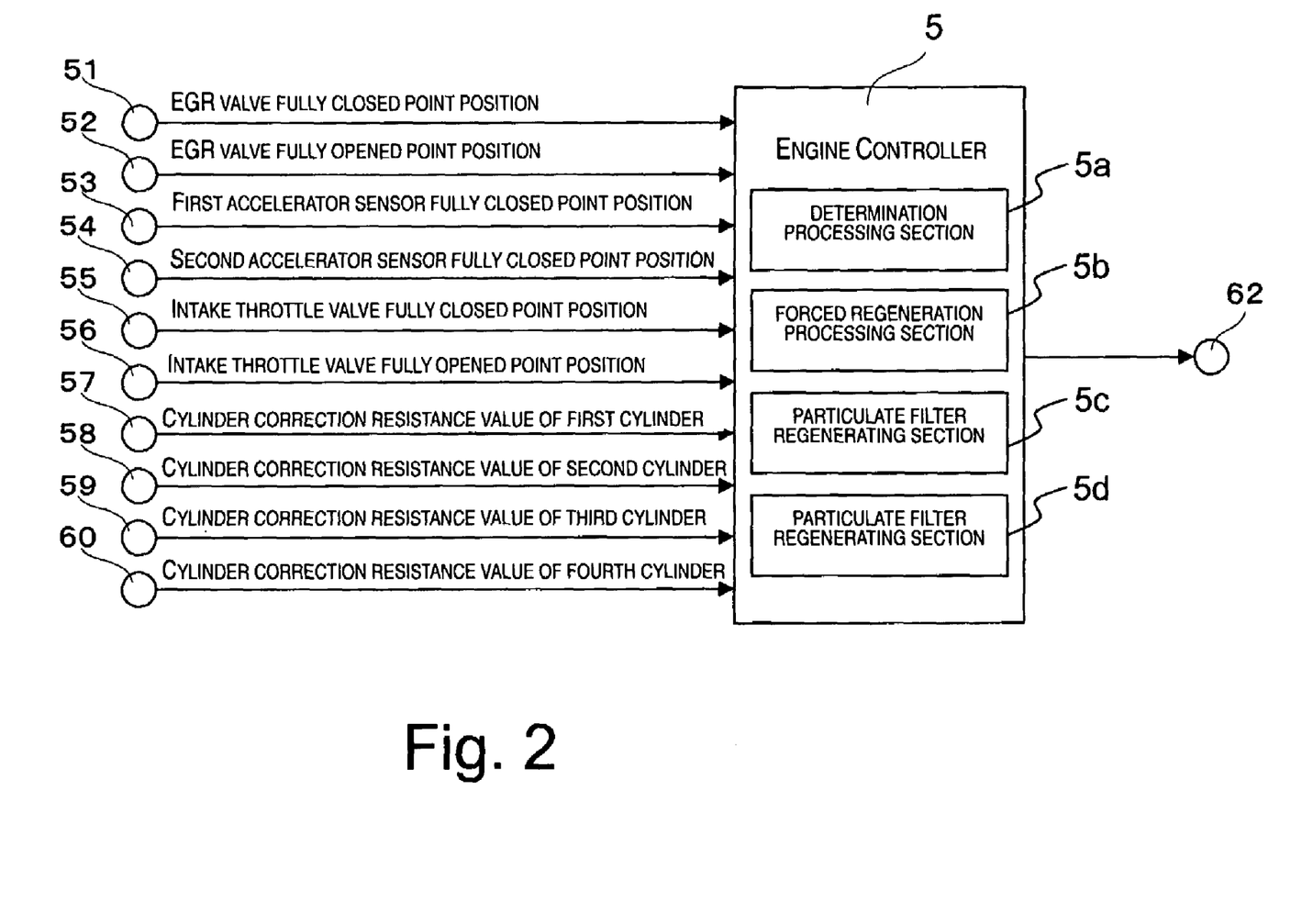
FIG. 2 is diagrammatic view of the engine controller and various sensors for illustrating analog input values the are inputted into the engine controller in accordance with the illustrated embodiment of the present invention.

The engine controller 5 receives a signal from an accelerator sensor 32 indicating throttle opening (level of depression of the accelerator pedal). The engine controller 5 receives a signal from a crank angle sensor 33 indicating engine rotational speed. The engine controller 5 receives a signal from a water temperature sensor 34 indicating coolant water temperature. The engine controller 5 receives a signal from an air flow meter 35 indicating intake air level. On the basis of engine load (throttle opening and so on) and engine rotational speed, the engine controller 5 calculates a fuel injection timing and fuel injection amount, and outputs a corresponding valve open command signal to the injectors 17. The processing executed by the engine controller 5 in FIG. 3 constitutes a determination processing section 5a and a forced regeneration processing section 5b. As seen in FIG. 2, the engine controller 5 also includes conventional processing that constitutes an accumulated particulate level estimating section 5c and a particulate filter regenerating section 5d. The accumulated particulate level estimating section 5c includes programming that is configured to estimate the accumulated level of the particulate matter in the particulate filter 41. The particulate filter regenerating section 5d includes programming that is configured to raise temperature of the particulate filter 41 to regenerate particulate that has accumulated, when the accumulated level of the particulate matter estimated by the accumulated level estimating section 5c has reached the prescribed level.

Moreover, on the basis of engine load (throttle opening and the like) and engine speed, the engine controller 5 calculates a target common rail fuel pressure, and controls the aforementioned intake control valve so that the actual fuel pressure within the accumulator 16 sensed by a pressure sensor is brought into agreement with the calculated target common rail fuel pressure. The engine controller 5 also coordinates EGR control and charging pressure control so as to achieve a target EGR rate and a target charging pressure.

The exhaust system of the engine 1 includes an exhaust gas after-treatment system such as a particulate filter 41 (diesel particulate filter: DPF) that is equipped with a catalyst for collecting and removing exhaust particulate matter (particulate matter or "PM"). The particulate filter 29 is constructed, for example, with a wall flow honeycomb structure (alternate cannel end blocked type) having a solid-cylindrical filter material such as cordierite with a plurality of honeycomb-shaped, fine passages formed therein and the alternate ends of the passages are closed. Thus, the particulate filter 41 is installed in the exhaust passage 2 for trapping particulate in exhaust gases. When the level of accumulated particulate in the particulate filter 41 reaches a prescribed value (threshold value), a filter regeneration process is initiated, and particulate that has accumulated in the particulate filter 41 is burned away.

Since a pressure loss of the particulate filter 41 changes as the exhaust particulate matter accumulates, a pressure differential sensor 36 is provided to detect the pressure difference between the inlet and outlet of the particulate filter 41. Of course, it will be apparent to those skilled in the art from this disclosure that, instead of using the pressure differential sensor 36 to detect the pressure difference directly, separate pressure sensors can be provided at the inlet and the outlet of the particulate filter 41 to find the pressure difference based on the two pressure values.

The pressure loss ΔP of the particulate filter 41 sensed by this pressure differential sensor 36 is sent to the engine controller 5, together with a filter inlet temperature T1 from a temperature sensor 37 and a filter outlet temperature T2 from a temperature sensor 38. In the engine controller 5, when on the basis of this information the time for regeneration of the particulate filter 41 is deemed to have arrived, a filter 41 regeneration process to raise the temperature of the particulate filter 41 to a target temperature is carried out using exhaust temperature elevation means known in the art (means for controlling the air excess ratio to a value close to the smoke limit, for example).

Meanwhile, in order to carry out complete regeneration so that all particulate having accumulated in the particulate filter 41 is burned away, it is necessary to increase the particulate burning temperature at least somewhat during the regeneration process, within a range that does not exceed the permissible temperature of the particulate filter 41. In consideration thereof, in the present embodiment the carrier which makes up the particulate filter 41 is coated with an oxidation catalyst. During the burning of the particulate, this oxidation catalyst promotes the oxidation reaction, substantially increasing the bed temperature of the particulate filter 41 to a corresponding extent, thus accelerating the burning of the particulate in the particulate filter 41.

With this kind of particulate filter 41 supporting an oxidation catalyst, the engine controller 5 will sense a bed temperature Tbed of the particulate filter 41 and calculate a cumulative value for the time period over which this sensed bed temperature exceeds a target bed temperature Tx, the value being designated as the effective regeneration period te. On the basis of this effective regeneration period te, a particulate regeneration level PMr, which represents the amount of particulate accumulated in the particulate filter 41 successfully burned away, is estimated, and from this estimated particulate regeneration level PMr there is calculated a particulate regeneration efficiency ηPM. On the basis of the particulate regeneration efficiency ηPM calculated in this manner, a high target inlet temperature Td is established (see for example, Japanese Laid Open Patent Publication No. 2005-201251).

The method for regenerating the particulate filter 41 is not limited to the method disclosed herein, it being possible to use any regeneration process known in the art.

In a diesel engine equipped with a filter that traps particulate in exhaust gases, such as the particulate filter 41, information for deciding whether it is time to regenerate the particulate filter 41 (e.g. accumulated particulate level, operation history, or the like) is stored in an EEPROM (storage device) in the engine controller 5, so as to not be lost after engine operation has been shut down. The EEPROM (storage device) of the engine controller 5 forms a storage section of the engine controller 5.

In such a case, if the engine controller 5 equipped with the storage device is replaced with a new one, the information mentioned above will be lost. Thus, the new engine controller will initiate control on the assumption that no particulate has accumulated in the particulate filter 41. That is, if any particulate has accumulated in the particulate filter 41 at the time that the engine controller 5 is replaced, a discrepancy equivalent to the accumulated particulate will arise. Consequently, if particulate that has accumulated in the particulate filter 41 is simply left at the time that the engine controller 5 is replaced, it is conceivable that an excessive amount of particulate will have accumulated in the particulate filter 41 by the time that the new engine controller 5 determines that the period to regenerate the particulate filter 41 has been reached.

It is accordingly necessary to forcibly carry out a regeneration process on the particulate filter 41 when replacing the engine controller 5, in order to burn away (regenerate) particulate from the particulate filter 41 so that excessive particulate does not accumulate in the particulate filter 41 by the time that the first filter 41 regeneration period is reached after the engine controller 5 is replaced with a new one. Thus, past practice at dealerships and service centers has been to use certain service tools in order to forcibly carry out a regeneration process when the engine controller 5 was replaced.

However, there are instances where, depending on conditions such as the geographical region or the dealership, service using the service tools mentioned above is not available. In such cases, irrespective of the fact that particulate has accumulated in the particulate filter 41 at the time that the engine controller 5 is replaced, after replacement the engine controller 5 will initiate control as if there was no particulate accumulation in the particulate filter 41. Consequently, by the time that after replacement the engine controller 5 determines that the first post-replacement regeneration period for the particulate filter 41 has arrived, particulate may have accumulated in the particulate filter 41 at a level exceeding the acceptable amount. Where particulate has accumulated to a level exceeding the acceptable amount by the time of the first regeneration process of the particulate filter 41 after replacement of the engine controller 5, and the burning of the particulate is brought about, there is a risk that the durability of the particulate filter 41 will be adversely affected by abnormal combustion.

In the illustrated embodiment of the present invention, a determination is made as to whether the engine 1 is being operated for the first time after replacement of the engine controller 5. In the event of a determination that the engine 1 is being operated for the first time after replacement of the engine controller 5, the particulate filter 41 regeneration process is forcibly executed. In this case, the determination as to whether the engine 1 is being operated for the first time after replacement of the engine controller 5 is made as follows. Specifically, where an immobilizer is provided, when engine operation is started, the engine controller 5 determines whether the identification code is being input for the first time. From the result of this determination, if identification code is being input for the first time, it is determined that the engine 1 is being operated for the first time after replacement of the engine controller 5.

If on the other hand, an immobilizer is not provided, the determination can be made as follows. In the event that the engine controller 5 that has malfunctioned is replaced with a used engine controller that was being used in another vehicle, analog values stored in the EEPROM will be those used in the other vehicle. Thus, new analog values input at the current time will naturally be different from the values in memory, since the vehicles are different. Accordingly, by comparing the analog values in memory in the EEPROM with the new analog values input at the current time and stored in another area of the EEPROM, it can be determined that a malfunctioning engine controller has been replaced with an engine controller from another vehicle. This is also true where an engine controller has been replaced with a used one.

Specifically, as shown in FIG. 2, ten types of analog values are inputted to the engine controller 5 and are then stored in the EEPROM (storage device) of the engine controller 5 each time the engine 1 is operated, so that the values will not be lost after the engine 1 is shut down. The analog values from the time of previous engine operation stored in EEPROM are compared with the analog values input at the time of engine startup. During the comparison, analog values of the same type are compared.

From the result of this comparison it is determined whether, of the analog values stored in memory in the EEPROM, several types of analog values differ from currently input analog values. If the number of types of analog values found to differ as a result of the determination exceeds a certain threshold value, the determination is made that the engine 1 is being operated for the first time after replacement of the engine controller 5.

Even in the event that there are no analog values from the time of previous engine operation stored in EEPROM at the time the engine is started up, since a determination will be made that the analog values in memory in the EEPROM differ from the analog values currently stored in another area of the EEPROM, the determination will be made that the engine is being operated for the first time after replacement of the engine controller 5.

As indicated in FIG. 2, in the illustrated embodiment, the analog input values that are inputted into the engine controller 5 are the following (1) to (10):

(1) EGR valve fully closed point position;
(2) EGR valve fully open point position;
(3) first accelerator sensor fully closed point position;
(4) second accelerator sensor fully closed point position;
(5) intake throttle valve fully closed point position;
(6) intake throttle valve fully open point position;
(7) first cylinder correction resistance value;
(8) second cylinder correction resistance value;
(9) third cylinder correction resistance value; and
(10) fourth cylinder correction resistance value.

These ten analog values are given by way of example of ones that experience some level of variability or degradation over time due to individual differences among engines, or that experience some level of variability or degradation over time due to individual differences among parts such as the EGR valve 6, the accelerator pedal, the intake throttle valve 42, or the injectors 17. These analog input values are values sensed respectively by an EGR valve closed position sensor 51, an EGR valve opened position sensor 52, a first accelerator sensor 53, a second accelerator sensor 54, an intake throttle valve sensor 55, an intake throttle valve sensor 56, a first cylinder injector correction resistance value sensor 57, a second cylinder injector correction resistance value sensor 58, a third cylinder injector correction resistance value sensor 59 and a fourth cylinder injector correction resistance value sensor 60. The EGR valve closed position sensor 51 is configured and arranged to detect a fully closed point position of the EGR valve 6. The second EGR valve opening position sensor 52 is configured and arranged to detect a fully opened point position of the EGR valve 6. The first accelerator sensor 53 is configured and arranged to detect a fully closed point position of the accelerator sensor 32. The second accelerator sensor 54 is configured and arranged to detect a fully closed point position of the accelerator sensor 32. The intake throttle valve sensor 55 is configured and arranged to detect a fully closed point position of the intake throttle valve 42. The intake throttle valve sensor 56 is configured and arranged to detect sensing a fully opened point position of the intake throttle valve 42. The first cylinder injector correction resistance value sensor 57 is configured and arranged to detect a cylinder correction resistance value of the first cylinder injector. The second cylinder injector correction resistance value sensor 58 is configured and arranged to detect a cylinder correction resistance value of the second cylinder injector. The third cylinder injector correction resistance value sensor 59 is configured and arranged to detect a cylinder correction resistance value of the third cylinder injector. The fourth cylinder injector correction resistance value sensor 60 is configured and arranged to detect a cylinder correction resistance value of the fourth cylinder injector.

For example, the fully closed positions of the accelerator sensors of (3) and (4) above refers to the position of the accelerator pedal when the accelerator pedal has been depressed fully. Since the position of the accelerator pedal is determined mechanically, some level of variability in sensor output voltage values may be produced due to individual differences among accelerator pedals. Similarly, the fully closed point position and the fully opened point position of the EGR valve 6 of (1) and (2) above, and the fully closed point position and the fully opened point position of the intake throttle valve 42 of (5) and (6) above, are also determined mechanically and will therefore experience some level of variability in sensor output voltage values due to individual differences among EGR valve components and intake throttle valve components. The two fully closed positions for the accelerator sensor 32 are preferably detected by the accelerator sensors 53 and 54 in case one of the accelerator sensors 53 and 54 should fail.

In order to correct individual variability in fuel injection characteristics among individual injectors 17, a prescribed resistance is connected to the solenoid mentioned earlier. The cylinder correction resistance values of (7) to (10) above refer to the resistance values of the aforementioned resistance connected thereto in order to correct variability in fuel injection amounts among cylinders due to individual differences among injectors 17, such that the fuel injection amount is the same for each cylinder. In the present embodiment, since there are four cylinders, there are also four cylinder correction resistance values for the injectors 17.

Since the analog input values sometimes include ones already input to the engine controller 5 for self-diagnostic purposes, in such instances it will not be necessary to furnish a sensor.

Figure 3:
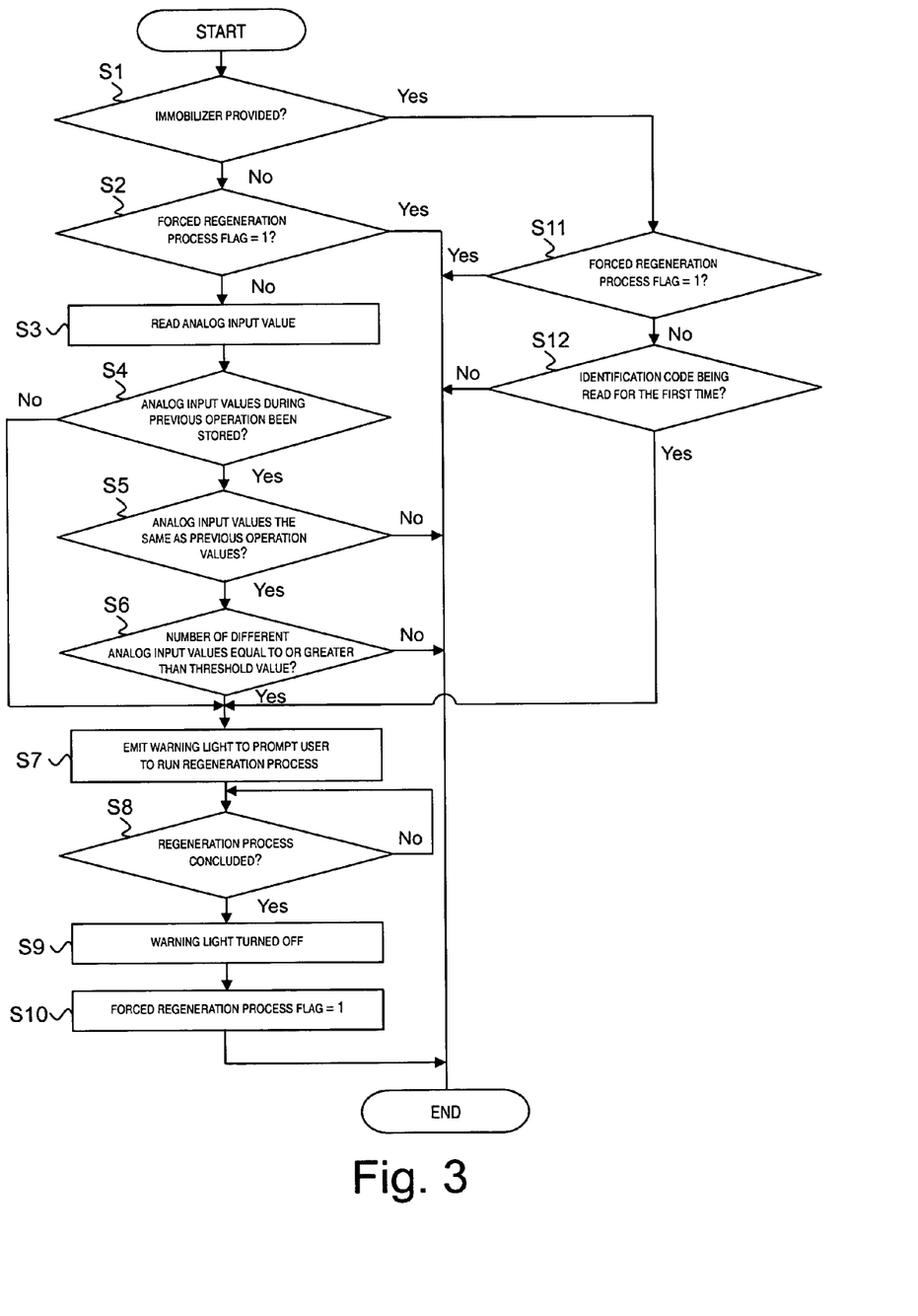
FIG. 3 is a flowchart illustrating the control operations executed by the exhaust purification apparatus in accordance with the present invention in order to execute a filter forcible regeneration process during engine operation for the first time following replacement of the engine controller with a new one.

This control executed by the engine controller 5 will now be described in detail based on the flowchart of FIG. 3. The flow of FIG. 3 is executed when the ignition switch of the vehicle is turned from OFF to ON, i.e., when the engine is currently being started. The flowchart depicts the flow of operations, and is not executed repeatedly at fixed time intervals.

In step S1, the engine controller 5 is configured to perform a check to determine if the engine is equipped with an immobilizer. Information as to whether an immobilizer is provided will be stored in ROM in the engine controller 5, and accordingly this information should be accessed.

If the engine controller 5 determines that an immobilizer has been provided, then the routine proceeds to step S11, and the engine controller 5 determines the status of a forced regeneration process flag. When the filter regeneration process is executed forcibly at engine startup the first time after replacement of the engine controller 5 in the manner described later, the forced regeneration process flag will be set to "1". If the forced regeneration process flag has been set to "0," the routine proceeds to step S12 and checks whether the identification code is being input to the engine controller 5 for the first time.

Figure 4:
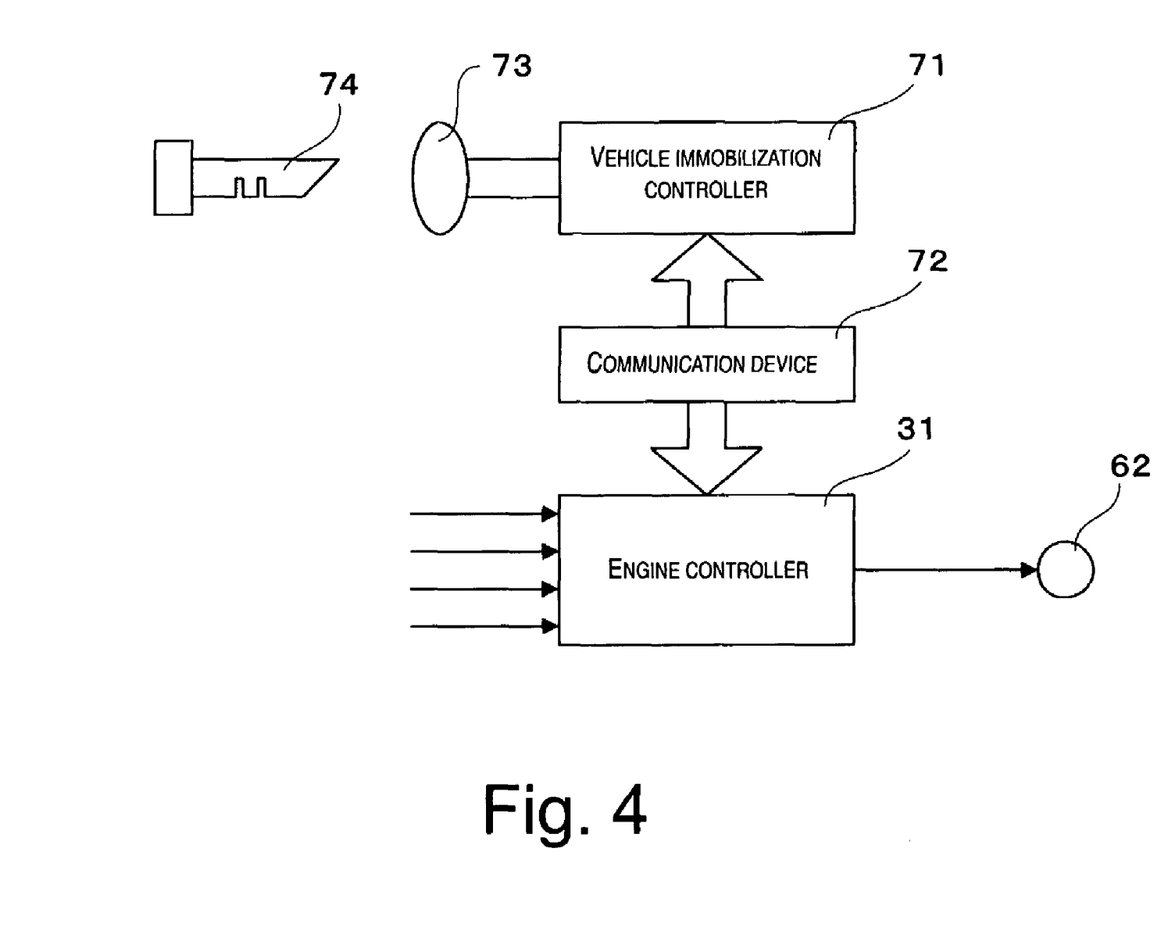
FIG. 4 is a simple schematic illustration of the immobilizer in accordance with the present invention.

Here, as disclosed in Japanese Laid-Open Patent Publication No. 8-244558, the immobilizer is simply constituted as shown in FIG. 4. Specifically, a vehicle immobilization controller 71 and the engine controller 5 are linked via a bidirectional communication device 72. The vehicle immobilization controller 71 is equipped with a transponder key 74. When an electromagnetic wave (or radio wave) is sent from the vehicle immobilization controller 71 via an antenna 73 to alert the transponder key 74, the transponder key 74 sends a unique electronic code. By then checking whether this code matches the code held in the vehicle immobilization controller 71, it can be verified whether the particular combination of the transponder key 74 and the vehicle immobilization controller 71 is correct. If the vehicle immobilization controller 71 has been removed and the vehicle immobilization controller 71 was installed in another vehicle, or if a transponder key of another vehicle is attempted to be used with the vehicle immobilization controller 71 installed in the vehicle, then a communication condition will not be established between the vehicle immobilization controller 71 and the engine controller 5. That is, possession of the transponder key 74 is necessary in order for a communication condition to be established between the vehicle immobilization controller 71 and the engine controller 5.

When the ignition switch is turned from OFF to ON, the identification code stored in memory in the vehicle immobilization controller 71 is checked against the identification code stored in memory in the engine controller 5. If the result of the check is that the codes match, then engine startup is enabled. However, if the result of the check is that the codes do not match, then engine startup is disabled (i.e., the vehicle is prevented from starting). Moreover, when the engine is shut off, the identification code stored in the vehicle immobilization controller 71 and the identification code stored in the engine controller 5 are updated to another code.

On the other hand, in the event of a malfunction of the engine controller 5, the engine controller 5 and the vehicle immobilization controller 71 (as well as the transponder key 74) will be replaced as a unit, and identification codes will be input for the first time to the controllers 31 and 71. This initial input is the initial input referred to in step S12.

When inputting the identification codes in step S12 is the initial input, this means that the engine is being started for the first time after replacing the engine controller 5 with a new one (i.e. initial engine startup). Specifically, the engine controller 5 determines that data (information when deciding whether the particulate filter 41 regeneration time has been reached) has been lost, and proceeding to step S7 where a warning light 62 is lit on an instrument panel in the vehicle cabin to prompt the user to run the regeneration process of the particulate filter 41.

Here, in step S7, the user is prompted to run the regeneration process of the particulate filter 41 so that the particulate filter 41 regeneration process will be forcibly carried out. There are at least three possible methods for forcibly carrying out the particulate filter 41 regeneration process. First, the warning light 62 is lit on the instrument panel in the vehicle cabin to prompt the driver to run the regeneration process of the particulate filter 41. Second, the user presses a regeneration running switch provided on the instrument panel in the vehicle cabin. Third, the engine controller 5 automatically carries out the particulate filter 41 regeneration process completely automatically. The first method is being shown in FIG. 3.

After prompting the user to run the regeneration process of the particulate filter 41, in step S8, the engine controller 5 checks whether running of the particulate filter 41 regeneration process has concluded (finished). For example, as long as the pressure loss ΔP of the particulate filter 41 sensed by the pressure differential sensor 36 exceeds a prescribed value, the system will remain in standby. If, upon being presented with light-up of the warning light 62, the user drives the vehicle at high speed for a predetermined continuous time period, the pressure loss ΔP of the particulate filter 41 will fall below the prescribed value, so at this time the determination will be made that forcible running of the particulate filter 41 regeneration process has completed. Once the engine controller 5 determines that the regeneration process has been completed, the process proceeds to step S9 where the warning light 62 will be turned off.

In the case of the two other methods mentioned earlier, running of the particulate filter 41 regeneration process is carried out forcibly by the engine controller 5 for a prescribed time interval. In this case, since information when determining whether the time for regeneration of the particulate filter 41 has been reached will be lost if the engine controller 5 is replaced, running of the particulate filter 41 regeneration process may be carried out forcibly, for example, on the assumption that particulate has accumulated up to the acceptable limit, carrying out the process for a time interval (suitable value) sufficient to burn away the entire amount of particulate accumulated up to the acceptable limit. By so doing, the particulate filter 41 is restored to the initial state free of accumulated particulate.

During engine operation for the first time after replacing the engine controller 5 with a new one, forcible running of the particulate filter 41 regeneration process concludes, so in step S10 the forced regeneration process flag is set to "1". The value of this forced regeneration process flag is stored in memory in the EEPROM in the engine controller 5 so that it will not be lost after the engine is shut down.

By setting the forced regeneration process flag to "1," starting with the next operation of the engine, the process will terminate with the forced regeneration process flag remaining set to "1" in step S11 as long as the engine controller 5 is not replaced. If, on the other hand, the engine controller 5 should be replaced again, then the forced regeneration process flag will be set to "0" in step S11, whereby the routine will proceed to step S12 and repeat the procedure described above.

If on the other hand in step S1 the engine controller 5 determines that an immobilizer is not provided, the routine proceeds to step S2 and checks the forced regeneration process flag in the same manner as in step S11. In this instance as well, if the forced regeneration process flag has been set to "0", proceeding to step S3 the analog input values sampled during the current engine operation are read. In step S4, it is checked whether analog input values at the time of the previous engine operation have been stored in the EEPROM in the engine controller 5, Here, if analog input values at the time of the previous engine operation have been stored in the EEPROM in the engine controller 5, then the process proceeds to step S5 where it is checked whether the analog input values sampled at the time of the current engine operation are the same as the pervious analog input values at the time of the previous engine operation.

Here, the analog input values are the aforementioned ten analog values of (1) to (10) sensed by the sensors 51 to 60 (sensor output voltage values).

In step S5, if differences between the analog input values at the time of current engine operation startup and the analog input values at the time of the previous engine operation are within the acceptable range for all ten analog input values, the engine controller 5 recognizes that the engine whose power supply was turned OFF at the time of the previous engine operation has had the power supply again turned ON for the current operation. That is, it is determined that the engine controller 5 has not been replaced, whereupon the process concludes without proceeding further.

If, on the other hand, the engine controller 5 has been replaced with a new one, since analog input values of the previous engine operation will not be stored in the EEPROM of the new engine controller 5, then the differences between the analog input values at the time of current engine operation startup and the analog input values at the time of the previous engine operation will not lie within the acceptable range. That is, due to the fact that the differences between the analog input values at the time of current engine operation and the analog input values at the time of the previous engine operation will not lie within the acceptable range, the engine controller 5 determines that the engine is being operated for the first time after replacement of the engine controller 5.

However, it is also possible that differences between the analog input values at the time of current engine operation startup and the analog input values at the time of the previous engine operation will not lie within the acceptable range, due to the EGR valve 6, the accelerator pedal, the intake throttle valve 42, or other component having been replaced for example. Thus, in order to distinguish between the two cases, that is, in order to avoid a situation where the determination as to whether the engine is being operated for the first time after replacement of the engine controller 5 is made in error, in the event that differences between the analog input values at the time of current engine operation startup and the analog input values at the time of the previous engine operation do not lie within the acceptable range, the routine proceeds from step S5 to step S6.

Here, since comparisons of analog input values at the time of current engine startup with the previous analog input values at the time of the previous engine operation are made for ten analog input values, there can logically be the following ten different cases (Case 1) to (Case 10) in each of which the routine will proceed to step S6.

Case 1 is where differences between the current analog input values at the time of current engine startup and the previous analog input values at the time of the previous engine operation lie outside the acceptable range for one analog input value.

Case 2 is where differences between the current analog input values at the time of current engine startup and the previous analog input values at the time of the previous engine operation lie outside the acceptable range for two analog input values.

Case 3 is where differences between the current analog input values at the time of current engine startup and the previous analog input values at the time of the previous engine operation lie outside the acceptable range for three analog input values.

Case 4 is where differences between the current analog input values at the time of current engine startup and the previous analog input values at the time of the previous engine operation lie outside the acceptable range for four analog input values.

Case 5 is where differences between the current analog input values at the time of current engine startup and the previous analog input values at the time of the previous engine operation lie outside the acceptable range for five analog input values.

Case 6 is where differences between the current analog input values at the time of current engine startup and the previous analog input values at the time of the previous engine operation lie outside the acceptable range for six analog input values.

Case 7 is where differences between the current analog input values at the time of current engine startup and the previous analog input values at the time of the previous engine operation lie outside the acceptable range for seven analog input values.

Case 8 is where differences between the current analog input values at the time of current engine startup and the previous analog input values at the time of the previous engine operation lie outside the acceptable range for eight analog input values.

Case 9 is where differences between the current analog input values at the time of current engine startup and the previous analog input values at the time of the previous engine operation lie outside the acceptable range for nine analog input values.

Case 10 is where differences between the current analog input values at the time of current engine startup and the previous analog input values at the time of the previous engine operation lie outside the acceptable range for ten analog input values.

In step S6, the number of analog input values for which the difference between the analog input values at the time of current engine startup and the analog input value at the time of the previous engine operation lies outside the acceptable range is compared with a threshold value. If the number of analog input values for which the difference between the analog input values at the time of current engine operation and the analog input value at the time of the previous engine operation lies outside the acceptable range should be equal to or greater than the threshold value, then the determination is made that the engine 1 is being operated for the first time after replacement of the engine controller 5, and the routine proceeds to step S7 and further. When, on the other hand, the number of analog input values for which the difference between the analog input values at the time of current engine operation and the analog input value at the time of the previous engine operation lies outside the acceptable range is smaller than the threshold value, then the determination is made that the engine controller 5 has not been replaced, and the process concludes without proceeding further.

Here, the threshold value is a number of at least 2 or greater. The reason that the threshold value is not 1 is in order to prevent a mistaken determination that the engine controller 5 has been replaced despite the fact that the engine controller 5 has not been replaced, occurring in the case where a part was replaced up to the time of the previous engine operation due to malfunction of the part and so on. For example, if one part among the EGR valve 6, accelerator pedal, and intake throttle valve 42 should happen to have been replaced, the aforementioned (Case 1) will be true, despite the fact that the engine controller 5 has not been replaced. If the threshold value were 1, a mistaken determination that the engine controller 5 has been replaced would be made in this instance.

In consideration of this point, the threshold value should be established at a value which is greater than the number among the aforementioned ten cases that could be true as a result of a part having been replaced. On this assumption, since it is not possible for five or more parts associated with analog input values to be replaced at any one time during a replacement of parts, a threshold value of 5 will be established in this case. During actual setting of the threshold value, it is necessary to consider part tolerances and the model of the vehicle in which the engine is installed.

Consequently, in the event that the number of analog input values that differ between the time of current engine startup and the time of the previous engine operation is either Case 1, 2, 3 or 4, it will be determined that the difference between analog input values between the time of engine startup and the time of the previous engine operation is the result of replacement of a part or parts due to malfunction of the part or parts, and not because the engine controller 5 has been replaced, and the process will conclude without proceeding further. In the event that the number of analog input values that differ between the time of current engine startup and the time of the previous engine operation is 0 as well, it is determined that the engine controller 5 has not been replaced, and the process will conclude without proceeding further.

In the event that the number of analog input values that differ between the time of current engine startup and the time of the previous engine operation is either Case 5, 6, 7, 8, 9 or 10, it will be determined that the difference between analog input values between the time of engine startup and the time of the previous engine operation is the result of replacement of the engine controller 5, that is, that the engine is being operated for the first time after replacement of the engine controller 5. The procedure of steps S7 to S9 will then be executed to carry out the particulate filter 41 regeneration process.

Meanwhile, in step S4 in the event that there are no analog input values from the time of the previous engine operation stored in memory in the EEPROM in the engine controller 5 as well, it will be determined that the engine is being operated for the first time after replacement of the engine controller 5. The routine, skipping steps S5 and S6, proceeds to steps S7 to S9 and executes the procedure of steps S7 to S9 to carry out the particulate filter 41 regeneration process.

In the event that an immobilizer is not provided, at the time that the engine is operated for the first time after replacement of the engine controller 5 with a new one, forcible running of the particulate filter 41 regeneration process will have concluded, so in step S10 the forced regeneration process flag is set to "1". The value of this forced regeneration process flag is stored in the EEPROM in the engine controller 5 so as not to be lost after engine operation has been shut down.

By setting the forced regeneration process flag to "1," starting with the next operation of the engine, the process will terminate with the forced regeneration process flag remaining set to "1" in step S2 as long as the engine controller 5 is not replaced. If on the other hand the engine controller 5 should be replaced again, the forced regeneration process flag will be set to "0" in step S2, whereby the routine will proceed to step S3 and repeat the procedure described above.

While the present embodiment describes a case wherein determinations are made for all of ten exemplary analog input values, this option is not limiting, it being possible to instead make determinations for some number among the ten analog input values. During actual setting of the number of analog input values for which determinations will be made, suitable values will be derived with consideration to part tolerances and the model of the vehicle in which the engine is installed.

The working effects of the embodiment shall now be discussed.

According to the present embodiment, the engine controller 5 is furnished with the determination processing section 5a that is configured to determine if an engine is operating for a first time following replacement of the engine controller itself. If it is determined by the determination processing section 5a that engine operation is taking place for the first time following replacement of the engine controller (see steps S1, S12 or steps S1, S3, S4, S5 and S6 in FIG. 3), a particulate filter will be regenerated even if the accumulated level of the particulate matter is below a prescribed level (see steps S7, S8 and S9 in FIG. 3). In other words, the forced regeneration processing section 5b of the engine controller 5 is configured to regenerate a particulate filter even if an accumulated level of particulate matter is below a prescribed level, upon the determination processing section determining that the engine 1 is being operated for the first time following replacement of the engine control controller 5. Thus, even if service using service tools is not available when the engine controller 5 is replaced, particulate combustion at a level exceeding the acceptable amount during the initial regeneration process of the particulate filter 41 after replacing the engine controller 5 may be avoided, and detrimental effects on filter 41 durability may be prevented.

Moreover, even in cases where service using service tools is available when the engine controller 5 is replaced, the labor entailed in replacing the engine controller 5 can be reduced, with no special measures needing to be taken by the technician in order to carry out regeneration of the particulate filter 41.

According to the present embodiment, there is provided an immobilizer that establishes a communication condition with the engine controller only in the event that the unique electronic code of the transponder key matches the code held by the vehicle immobilization controller. If a communication condition is established, the identification codes held by the vehicle immobilization engine controller and the engine controller are verified, and it becomes possible to start the engine only in the event that the identification codes match. The determination processing section determines at the time of startup of engine operation whether inputting the identification code to the engine controller 5 is taking place for the first time (see steps S1 and S12 in FIG. 3). In the event that this determination result is that the identification code is being input to the engine controller 5 for the first time, the engine controller 5 determines that engine operation is taking place for the first time following replacement of the engine controller 5 (see steps S1, S19 and S7 to S9 in FIG. 3). As long as an immobilizer is provided, it can be determined that engine operation is taking place for the first time following replacement of the engine controller 5.

According to the present embodiment, the determination processing section stores a plurality of analog values input to the engine controller 5 in the EEPROM (storage device) in the engine controller 5. The multiple types of analog input values for the time of previous engine operation stored in the EEPROM are then compared with multiple types of new analog input values which are input at the time of startup of engine operation and which are of the same type as the analog input values for the time of previous engine operation (see steps S1, S3 and S5 in FIG. 3). Then, if as a result of this comparison there is a difference between the time of the previous operation and the engine startup time in terms of the multiple types of analog input values, the number of types of different analog input values is counted, and the number of types of analog values of different results so counted is then further compared with a threshold value (see step S6 in FIG. 3). In the event that as a result of this comparison the number of differing analog values is equal to or greater than the threshold value, it is determined that engine operation is taking place for the first time following replacement of the engine controller 5 (see steps S6 and S7 to S9 in FIG. 3). It is possible thereby to determine that engine operation is taking place for the first time following replacement of the engine controller 5, despite the lack of an immobilizer.

According to the present embodiment, in the event that an immobilizer is not provided, several types of analog input values input to the engine controller 5, which are for the time of previous engine operation, are stored in the EEPROM (storage device) in the engine controller 5. In the event that at the time of startup of engine operation these multiple types of analog input values for the time of the previous engine operation are not present in memory in the EEPROM, it is determined that engine operation is taking place for the first time following replacement of the engine controller 5 (see steps S1, S3 and S4 in FIG. 3). It is thereby possible to determine that engine operation is taking place for the first time following replacement of the engine controller 5, despite the lack of an immobilizer.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An exhaust purification apparatus comprising:
   an accumulated particulate level estimating section configured to estimate an accumulated level of particulate matter in a particulate filter;
   a particulate filter regenerating section configured to raise temperature of the particulate filter to regenerate particulate that has accumulated, when the accumulated level of the particulate matter estimated by the accumulated level estimating section has reached a prescribed level;
   a determination processing section configured to determine if an engine is operating for a first time following replacement of an engine controller; and
   a regeneration processing section configured to regenerate a particulate filter even if the accumulated level of particulate matter is below the prescribed level, upon the determination processing section determining that the engine is being operated for the first time following replacement of the engine controller.

2. The exhaust purification apparatus according to claim 1, wherein
   the determination processing section is further configured to determine if an identification code from a vehicle immobilizer has been received that permits the engine to be started for the first time at engine startup, and the determination processing section being further configured to determine that engine operation is taking place for the first time following replacement of the engine controller, upon the determination processing section determining that the identification code is being inputted to the engine controller for the first time.

3. The exhaust purification apparatus according to claim 1, wherein
   the determination processing section is further configured to
   store a plurality of analog values to be inputted to the engine controller;
   perform a comparison between previous engine operation analog values stored in the storing section for a time of previous engine operation and current engine operation analog values newly inputted at a current time of starting the engine; and
   determine a quantity of corresponding ones of the previous engine operation analog values and the current engine operation analog values that differ from each other as determined by the comparison, and then determine if the quantity of differing values exceeds a prescribed threshold value in which the determination processing section then determines that engine operation is taking place for the first time following replacement of the engine controller.

4. The exhaust purification apparatus according to claim 1, wherein
   the determination processing section is further configured to store a plurality of analog values to be inputted to the engine controller, and determine that the engine is being operated for the first time following replacement of the engine controller if previous engine operation analog values at a time of a previous engine operation are not currently stored at engine startup.

5. The exhaust purification apparatus according to claim 3, wherein
   the determination processing section is further configured to perform the comparison on the analog values that at least one of degrades and varies over time due to individual differences among at least one of engines and parts.

6. An exhaust purification apparatus comprising:
   accumulated particulate level estimating means for estimating an accumulated level of particulate matter in a particulate filter;
   particulate filter regenerating means for raising temperature of the particulate filter to regenerate particulate that has accumulated, when the accumulated level of the particulate matter estimated by the accumulated level estimating means has reached the prescribed level;
   determination processing means for determining if an engine is operating for a first time following replacement of an engine controller;
   regeneration processing means for regenerating the particulate filter even if the accumulated level of particulate matter is below the prescribed level, upon the determination processing means determining that the engine is being operated for the first time following replacement of the engine controller.

7. An exhaust purification method comprising:

estimating an accumulated level of particulate matter in a particulate filter;

raising temperature of the particulate filter to regenerate particulate that has accumulated, when the accumulated level of the particulate matter has reached the prescribed level;

determining if an engine is operating for a first time following replacement of an engine controller; and regenerating a particulate filter even if the accumulated level of particulate matter is below the prescribed level, upon determining that the engine is being operated for the first time following replacement of the engine controller.

* * * * *